(12) United States Patent
Hinata et al.

(10) Patent No.: US 10,283,154 B2
(45) Date of Patent: May 7, 2019

(54) MAGNETIC RECORDING MEDIUM AND MAGNETIC STORAGE APPARATUS

(71) Applicants: SHOWA DENKO K.K., Tokyo (JP); TOHOKU UNIVERSITY, Miyagi (JP)

(72) Inventors: Shintaro Hinata, Miyagi (JP); Shin Saito, Miyagi (JP); Takayuki Fukushima, Chiba (JP); Haruhisa Ohashi, Chiba (JP); Kazuya Niwa, Chiba (JP); Lei Zhang, Chiba (JP); Yuji Murakami, Chiba (JP); Hisato Shibata, Chiba (JP); Takehiro Yamaguchi, Chiba (JP); Tetsuya Kanbe, Chiba (JP); Tomoo Shige, Chiba (JP)

(73) Assignees: SHOWA DENKO K.K., Tokyo (JP); TOHOKU UNIVERSITY, Miyagi (JP)

( * ) Notice: Subject to any disclaimer, the term of this patent is extended or adjusted under 35 U.S.C. 154(b) by 0 days.

(21) Appl. No.: 15/979,965

(22) Filed: May 15, 2018

(65) Prior Publication Data
US 2018/0358041 A1    Dec. 13, 2018

(30) Foreign Application Priority Data
Jun. 8, 2017   (JP) .................. 2017-113605

(51) Int. Cl.
| | |
|---|---|
| *G11B 5/65* | (2006.01) |
| *G11B 5/66* | (2006.01) |
| *G11B 5/48* | (2006.01) |
| *G11B 5/73* | (2006.01) |
| *G11B 5/00* | (2006.01) |
| *G11B 5/60* | (2006.01) |

(52) U.S. Cl.
CPC .............. *G11B 5/65* (2013.01); *G11B 5/4866* (2013.01); *G11B 5/66* (2013.01); *G11B 5/7325* (2013.01); *G11B 5/6088* (2013.01); *G11B 2005/0021* (2013.01)

(58) Field of Classification Search
CPC ........... G11B 5/65; G11B 5/4866; G11B 5/66; G11B 5/7325; G11B 5/6088
USPC ......................................... 360/135
See application file for complete search history.

(56) References Cited

U.S. PATENT DOCUMENTS

| | | | |
|---|---|---|---|
| 6,068,739 A | 5/2000 | Suzuki et al. | |
| 6,301,088 B1 * | 10/2001 | Nakada ................ | B82Y 10/00 360/324.11 |
| 6,690,163 B1 * | 2/2004 | Hoshiya ................ | B82Y 10/00 324/252 |

(Continued)

FOREIGN PATENT DOCUMENTS

| | | |
|---|---|---|
| JP | H11-353648 | 12/1999 |
| JP | 2007-018688 | 1/2007 |
| JP | 2012-221543 | 11/2012 |

*Primary Examiner* — Allen T Cao
(74) *Attorney, Agent, or Firm* — IPUSA, PLLC

(57) ABSTRACT

A magnetic recording medium includes a substrate, a barrier layer, a crystal grain size control layer, and a magnetic layer that are arranged in this order. The barrier layer includes at least one of oxides, nitrides, and carbides, and the crystal grain size control layer is a crystalline layer including Ag and having an average thickness in a range of 0.1 nm to 1 nm. The barrier layer makes contact with the crystal grain size control layer, and the magnetic layer includes an alloy having a $L1_0$ crystal structure and a (001) face orientation.

15 Claims, 3 Drawing Sheets

(56) References Cited

U.S. PATENT DOCUMENTS

| | | | |
|---|---|---|---|
| 7,901,737 B2 | 3/2011 | Yasui et al. | |
| 8,445,979 B2 * | 5/2013 | Oh | B82Y 25/00 257/421 |
| 9,824,710 B1 * | 11/2017 | Yuan | G11B 5/7325 |
| 10,109,309 B1 * | 10/2018 | Jubert | G11B 5/708 |
| 2006/0141293 A1 * | 6/2006 | Gouke | G11B 5/732 428/831.2 |
| 2013/0250453 A1 * | 9/2013 | Iwasaki | G11B 5/732 360/99.08 |
| 2014/0272470 A1 * | 9/2014 | Wang | G11B 5/84 428/800 |
| 2015/0017480 A1 * | 1/2015 | Hirotsune | G11B 5/314 428/800 |
| 2015/0117166 A1 * | 4/2015 | Zhang | G11B 5/65 369/13.5 |
| 2016/0232946 A1 * | 8/2016 | Stoebe | G11B 5/3106 |

* cited by examiner

FIG.5

|  | CRYSTAL GRAIN SIZE CONTROL LAYER | | MAGNETIC LAYER | |
|---|---|---|---|---|
|  | MATERIAL | AVERAGE THICKNESS [nm] | AVERAGE GRAIN DIAMETER OF FePt GRAINS [nm] | FWHM OF FePt(200) PEAK [°] |
| EI1 | Ag | 1 | 5.3 | 10.0 |
| EI2 | Ag | 0.5 | 4.9 | 10.8 |
| EI3 | Ag | 0.2 | 3.7 | 11.5 |
| EI4 | Ag | 0.1 | 3.5 | 12.4 |
| CE1 | – | – | 6.0 | 12.4 |
| CE2 | Ag | 0.05 | 5.8 | 12.3 |
| CE3 | Ag | 2 | 18.3 | 10.8 |
| EI5 | Ag-2Ge | 0.5 | 4.9 | 10.9 |
| EI6 | Ag-5Ge | 0.5 | 4.8 | 10.9 |
| EI7 | Ag-10Ge | 0.5 | 4.8 | 10.8 |
| EI8 | Ag-20Ge | 0.5 | 4.6 | 10.5 |
| EI9 | Ag-30Ge | 0.5 | 4.2 | 10.2 |
| EI10 | Ag-50Ge | 0.5 | 3.9 | 9.5 |
| EI11 | Ag-60Ge | 0.5 | 3.9 | 9.9 |
| EI12 | Ag-70Ge | 0.5 | 3.9 | 10.6 |
| EI13 | Ag-20B | 0.5 | 3.5 | 12.7 |
| EI14 | Ag-20C | 0.5 | 3.6 | 11.3 |
| EI15 | Ag-20 (BN) | 0.5 | 3.4 | 9.5 |
| EI16 | Ag-10Cu | 0.5 | 4.5 | 12.1 |
| EI17 | Ag-50Si | 0.5 | 4.6 | 9.9 |
| EI18 | Ag-50Ni | 0.5 | 4.9 | 10.5 |
| EI19 | Ag-50Tl | 0.5 | 5.0 | 12.5 |
| EI20 | Ag-50Sn | 0.5 | 5.0 | 11.5 |
| EI21 | Ag-20 (MgO) | 0.5 | 3.1 | 10.0 |
| CE4 | Cu | 1 | 5.6 | – |
| CE5 | Ag-20 ($SiO_2$) | 5 | 15.0 | 10.5 |
| CE6 | Ag-20Cu | 5 | 16.5 | 10.0 |

MAGNETIC RECORDING MEDIUM AND MAGNETIC STORAGE APPARATUS

CROSS-REFERENCE TO RELATED APPLICATIONS

This application is based upon and claims priority to Japanese Patent Application No. 2017-113605 filed on Jun. 8, 2017, the entire contents of which are incorporated herein by reference.

BACKGROUND OF THE INVENTION

1. Field of the Invention

The present invention relates to a magnetic recording medium, and a magnetic storage apparatus including the magnetic recording medium.

2. Description of the Related Art

Recently, there are increased demands to increase recording density of magnetic recording media that are used in the HDDs (Hard Disk Drives) to increase storage capacity of the HDDs.

However, it is becoming more difficult to improve the recording density of magnetic recording media and improve the storage capacity of the HDDs using existing recording methods.

The heat assisted magnetic recording method is one of next-generation recording methods that are actively studied, and is regarded as a promising recording method for further improving the recording density of the magnetic recording media. The heat assisted magnetic recording medium uses a magnetic head that irradiates near-field light on the magnetic recording medium. As a result, a surface of the magnetic recording medium is locally heated to assist recording, to record information on the magnetic recording medium in a state in which a coercivity of the magnetic recording medium is locally reduced.

When employing the heat assisted magnetic recording method, a magnetic layer of the magnetic recording medium is made of a high-Ku material having a $L1_0$ crystal structure, where Ku denotes a magnetic anisotropy constant. Examples of such high-Ku materials include FePt having a Ku of approximately $7 \times 10^7$ erg/cm$^3$, CoPt having a Ku of approximately $5 \times 10^7$ erg/cm$^3$, or the like. When the high-Ku material is used for the magnetic layer, a KuV/kT value becomes large, where V denotes grain volume, k denotes Boltzmann's constant, and T denotes temperature. For this reason, the use of the high-Ku material for the magnetic layer can reduce the volume of the magnetic grains without increasing thermal instability. By reducing the size of the magnetic grains, the heat assisted magnetic recording method can narrow the magnetization transition width, to thereby improve SNR (Signal-to-Noise Ratio).

In order to obtain the magnetic recording medium employing the heat assisted magnetic recording method and having a high perpendicular magnetic anisotropy, an alloy forming the magnetic layer and having a $L1_0$ crystal structure is required to exhibit a satisfactory (001) orientation. Because the (001) orientation of the magnetic layer is controlled by an underlayer, a material forming the underlayer needs to be appropriately selected.

Conventionally, known materials forming the underlayer of the magnetic recording medium employing the heat assisted magnetic recording method include MgO, CrN, TiN, or the like.

As an example, Japanese Laid-Open Patent Publication No. 11-353648 proposes forming an underlayer having MgO as a main component, and further forming a $L1_0$ ordered alloy layer made of FePt alloy.

As another example, Japanese Laid-Open Patent Publication No. 2007-018688 proposes forming, on a MgO(001) layer that is provided as an underlayer, a Ag grain layer (thickness of 5 nm) having a granular structure and (001) orientation, and a FePt magnetic grain layer having a granular structure and (001) orientation formed on the Ag grain layer.

As still another example, Japanese Laid-Open Patent Publication No. 2012-221543 proposes forming a heat sink layer between a MgO layer that is provided as an underlayer, and a magnetic layer including an alloy having a $L1_0$ crystal structure as a main component. The heat sink layer includes Ag as a main component, includes one or more elements selected from a first group of added elements consisting of Bi, Nd, Cu, and Cr, and further includes one or more elements selected from a second group of added elements consisting of Zn, La, Ga, Ge, Sm, Gd, Sn, and In.

In order to obtain satisfactory magnetic recording characteristics of the magnetic recording medium, a specific underlayer needs to be used as described above, so that the magnetic layer including the alloy having the $L1_0$ crystal structure has a satisfactory (001) orientation.

In addition, in order to obtain a magnetic recording medium having a high recording density, it is required to reduce the size of magnetic grains forming the magnetic layer while maintaining the (001) orientation.

However, according to the prior art, it is difficult to simultaneously maintain satisfactory (001) orientation of the magnetic layer that includes the alloy having the $L1_0$ crystal structure and reduce size of magnetic grains forming the magnetic layer to a satisfactory extent.

SUMMARY OF THE INVENTION

Embodiments of the present invention can provide a magnetic recording medium and a magnetic storage apparatus, which can maintain satisfactory (001) orientation of a magnetic layer that includes an alloy having a $L1_0$ crystal structure, and also reduce size of magnetic grains forming the magnetic layer.

According to one aspect of embodiments of the present invention, a magnetic recording medium includes a substrate, a barrier layer, a crystal grain size control layer, and a magnetic layer that are arranged in this order, wherein the barrier layer includes at least one of oxides, nitrides, and carbides, wherein the crystal grain size control layer is a crystalline layer including Ag and having an average thickness in a range of 0.1 nm to 1 nm, wherein the barrier layer makes contact with the crystal grain size control layer, and wherein the magnetic layer includes an alloy having a $L1_0$ crystal structure and a (001) face orientation.

According to another aspect of the embodiments of the present invention, a magnetic storage apparatus includes the magnetic recording medium referred above; and a magnetic head configured to write information to and read information from the magnetic recording medium.

Other objects and further features of the present invention will be apparent from the following detailed description when read in conjunction with the accompanying drawings.

BRIEF DESCRIPTION OF THE DRAWINGS

FIG. 5 is a table illustrating evaluation results of an average grain diameter of FePt magnetic grains and a FePt(200) peak of a magnetic layer for exemplary implementations and comparison examples.

DESCRIPTION OF THE PREFERRED EMBODIMENTS

Figure 1:
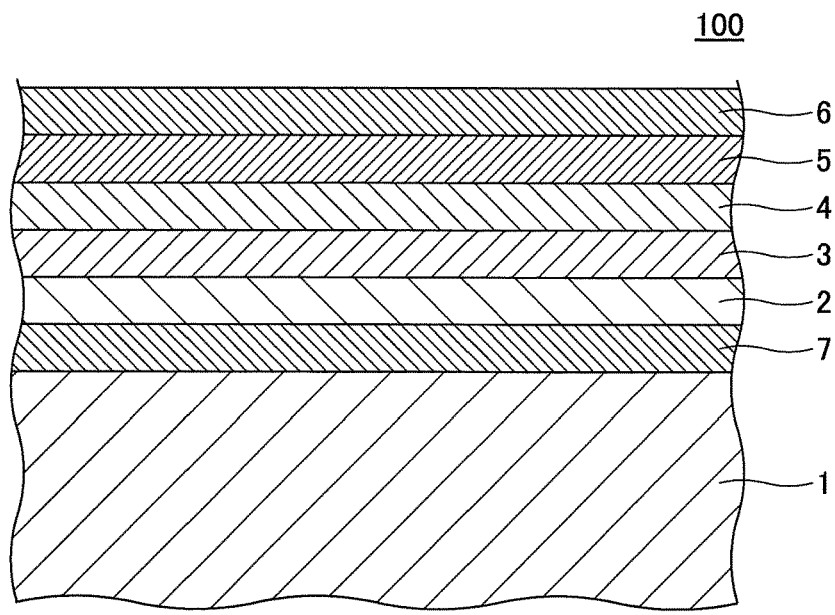
FIG. 1 is a cross sectional view illustrating an example of a magnetic recording medium in one embodiment of the present invention.

Embodiments and exemplary implementations of a magnetic recording medium and a magnetic storage apparatus according to the present invention will be described, by referring to the drawings. In each of the embodiments, the configuration, arrangements or positions, materials, and amounts (at % or mol %) of elements used in the magnetic recording medium or the magnetic storage apparatus may be appropriately modified, unless indicated otherwise.

[Magnetic Recording Medium]

FIG. 1 is a cross sectional view illustrating an example of a magnetic recording medium in one embodiment of the present invention. In this example, a magnetic recording medium 100 is a heat assisted magnetic recording medium employing the heat assisted magnetic recording medium. The heat assisted magnetic recording medium is sometimes also referred to as a thermally assisted magnetic recording medium.

The magnetic recording medium 100 includes a substrate 1, an underlayer 7, a barrier layer 2, a crystal grain size control layer 3, a magnetic layer 4, a carbon protection layer 5, and a lubricant layer 6 that are arranged in this order. The barrier layer 2 includes at least one of oxides, nitrides, and carbides. The crystal grain size control layer 3 is a crystalline layer including Ag, and has an average thickness in a range of 0.1 nm to 1 nm, for example. The barrier layer 2 makes contact with the crystal grain size control layer 3. The magnetic layer 4 includes an alloy having a $L1_0$ crystal structure and a (001) face orientation.

The magnetic recording medium 100 can obtain effects of maintaining satisfactory (001) orientation of the magnetic layer 4, and also reducing the size of the magnetic grains forming the magnetic layer 4, by employing the structure described above.

It is regarded by the present inventors that the above described effects are obtainable in the magnetic recording medium 100 for the following reasons.

Figure 2A:
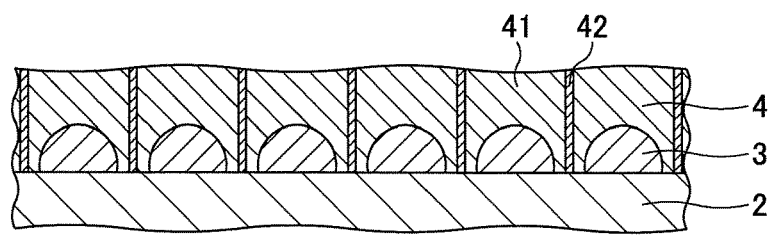
FIG. 2A and FIG. 2B are diagrams illustrating parts of the magnetic recording medium illustrated in FIG. 1 on an enlarged scale.

That is, when a material including Ag is deposited to form a thin film on the barrier layer 2 that includes an oxide, the material including Ag does not diffuse but instead agglomerates on a surface of the barrier layer 2 to form point-like (or dot-like) precipitates, because the material including Ag has a poor wettability with respect to the surface of the barrier layer 2, as illustrated in FIG. 2A. FIG. 2A is diagram illustrating a part of the magnetic recording medium illustrated in FIG. 1 on an enlarged scale.

The point-like precipitates including Ag have a high density and grain sizes (or grain diameters) that are approximately the same, and are crystalline with a satisfactory (001) orientation. For this reason, the point-like precipitates including Ag make satisfactory lattice matching to the magnetic layer 4 that is formed on the crystal grain size control layer 3 and has the $L1_0$ crystal structure and the (001) face orientation. In addition, the magnetic grains forming the magnetic layer 4 grow on the point-like precipitates forming the crystal grain size control layer 3 on a 1:1 basis, to increase a nucleus generation density of the magnetic grains forming the magnetic layer 4. As a result, it is possible to simultaneously maintain satisfactory (001) orientation of the magnetic layer 4 and reduce the grain size of the magnetic grains forming the magnetic layer 4.

In the magnetic recording medium 100, the crystal grain size control layer 3 may be formed by a material including Ag that forms layered precipitates.

Figure 2B:
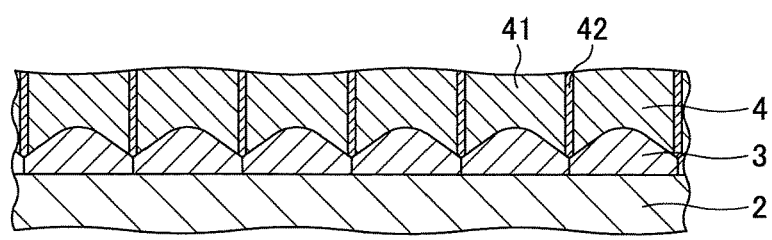

In other words, when the point-like precipitates forming the crystal grain size control layer 3 grow further, the layered precipitates are formed by combining with adjacent point-like precipitates, as illustrated in FIG. 2B. FIG. 2A is diagram illustrating a part of the magnetic recording medium illustrated in FIG. 1 on an enlarged scale. In this case, the magnetic grains forming the magnetic layer 4 grow on tops of the layered precipitates forming the crystal grain size control layer 3 on a 1:1 basis, to increase the nucleus generation density of the magnetic grains forming the magnetic layer 4.

The magnetic layer 4 in this example has a granular structure. As illustrated in FIG. 2A and FIG. 2B, the magnetic layer 4 includes magnetic grains 41, and grain boundary parts 42 that are made of an oxide or the like and isolate the magnetic grains 41. The magnetic grains 41 are columnar crystals extending in a direction in which a thickness of a stacked structure of the magnetic recording medium 100 is taken.

Of course, the magnetic layer 4 may have a non-granular structure.

In this embodiment, the average thickness of the crystal grain size control layer 3 is in the range of 0.1 nm to 1 nm, and more preferably in a range of 0.1 nm to 0.5 nm. When the average thickness of the crystal grain size control layer 3 is less than 0.1 nm, the material including Ag uneasily agglomerates, and inhibits the growth of the magnetic grains on the point-like precipitates including Ag. In this case, the nucleus generation density of the magnetic grains decreases, and inconsistency of the nucleus generation density of the magnetic grains increases. On the other hand, when the average thickness of the crystal grain size control layer 3 exceeds 1 nm, coarsening of the point-like precipitates forming the crystal grain size control layer 3 occurs. In this latter case, the nucleus generation density of the magnetic grains growing on the point-like precipitates decreases, and coarsening of the magnetic grains also occurs.

In this embodiment, the crystal grain size control layer 3 is a crystalline layer including Ag, but preferably includes one or more added materials selected from a group consisting of B, C, Si, Ge, Cu, Ni, Ti, Sn, BN, and MgO. As described above, the material including Ag does not diffuse but instead agglomerates on the surface of the barrier layer 2 to form the point-like precipitates, because the material including Ag has a poor wettability with respect to the surface of the barrier layer 2. However, when the material including Ag includes the one or more added materials, it is possible to increase the effects of agglomerating the material including Ag on the surface of the barrier layer 2 and forming the point-like precipitates. In other words, the one or more added materials are eutectic with respect to Ag, and inhibit Ag grains from combining to form a layer, to more easily form the point-like precipitates, when the material including Ag includes the one or more added materials.

The crystal grain size control layer 3 preferably includes the one or more added materials in a range of 5 mol % to 60 mol %, and more preferably includes the one or more added materials in a range of 15 mol % to 55 mol %. When an amount of the one or more added materials is 5 mol % or more, the above described effects of including the one or more added materials in the material including Ag increases. On the other hand, when the amount of the one or more added materials is 60 mol % or less, the material including Ag more easily agglomerates, and the above described effects of including the one or more added materials in the material including Ag increases.

In this embodiment, the barrier layer 2 includes at least one of oxides, nitrides, and carbides, but preferably includes one or more materials selected from a group consisting of MgO, TiO, NiO, TiN, TaN, HfN, NbN, ZrC, HfC, TaC, NbC, and TiC. In this case, an amount of the one or more materials included in the barrier layer 2 is preferably 40 mol % or greater, and the barrier layer 2 preferably has a NaCl structure. In this case, it is possible to deteriorate the wettability of the material including Ag with respect to the surface of the barrier layer 2, and to more easily form the point-like precipitates from the material including Ag.

In this embodiment, the underlayer 7 is provided between the substrate 1 and the barrier layer 2. For this reason, the barrier layer 2 can reduce mutual diffusion between the magnetic layer 4 and the underlayer 7. In other words, in this embodiment, the magnetic layer 4 includes the alloy having the $L1_0$ crystal structure and the (001) face orientation, but the substrate 1 may be heated when forming the magnetic layer 4 to promote ordering (or ordered structure) of the magnetic layer 4. In this case, the barrier layer 2 can reduce the mutual diffusion between the magnetic layer 4 and the underlayer 7.

The barrier layer 2 preferably has a thickness in a range of 0.5 nm to 10 nm. When the thickness of the barrier layer 2 is 0.5 nm or more, it is easier to reduce the mutual diffusion between the magnetic layer 4 and the underlayer 7 when the substrate 1 is heated. On the other hand, when the thickness of the barrier layer 2 is 10 nm or less, heat is more easily transferred in a direction from the magnetic layer 4 to the substrate 1, and characteristics of the magnetic recording medium 100 employing the heat assisted recording medium improve.

The underlayer 7 preferably makes lattice matching to the magnetic layer 4 that is formed on the underlayer 7 and has the $L1_0$ crystal structure. The underlayer 7 may have a single-layer structure (that is, single-layered), or a multi-layer structure (that is, multi-layered).

Examples of materials that may form the underlayer 7 include a material having a BCC (Body Centered Cubic) crystal structure and (001) face orientation, a material having a B2 crystal structure and (001) face orientation, or the like.

Examples of the material having the BCC crystal structure and the (001) face orientation include Cr, W, an alloy including Cr or W, or the like.

Examples of the material having the B2 crystal structure and the (001) face orientation include RuAl, NiAl, or the like. Examples of the alloy including Cr include CrMn, CrMo, CrW, CrV, CrTi, CrRu, CrVTi, or the like. In addition, examples of the alloy including W include WMo, WCu, WNi, WFe, WRe, WC, or the like.

In this embodiment, the alloy having the $L1_0$ crystal structure and used for the magnetic layer 4 has a high magnetic anisotropy constant Ku (high-Ku alloy). Examples of the alloy having the high magnetic anisotropy constant Ku include FePt alloys, CoPt alloys, or the like.

In this embodiment, when forming the magnetic layer 4, a heat treatment is preferably performed to promote the ordering of the alloy having the $L1_0$ crystal structure. In this case, one or more elements, such as Ag, Au, Cu, Ni, or the like, may be added to the alloy having the $L1_0$ crystal structure in order to reduce a temperature (or ordering temperature) at which the heat treatment is performed.

In addition, the crystal grains of the alloy having the $L1_0$ crystal structure and included in the magnetic layer 4 are preferably magnetically isolated. For this reason, the magnetic layer 4 preferably further includes one or more materials selected from a group consisting of $SiO_2$, $TiO_2$, $Cr_2O_3$, $Al_2O_3$, $Ta_2O_5$, $ZrO_2$, $Y_2O_3$, $CeO_2$, MnO, TiO, ZnO, $B_2O_3$, C, B, BN, and MgO. In this case, exchange coupling between the crystal grains is more positively decoupled, to further improve the SNR of the magnetic recording medium 100.

The carbon protection layer 5 and the lubricant layer 6 are successively provided on the magnetic layer 4. The lubricant layer 6 may be formed by a liquid lubricant layer made of a perfluoropolyether fluororesin. Known materials may be used for the carbon protection layer 5 and the lubricant layer 6, respectively.

In order to improve the write characteristic, a soft magnetic layer may be provided under the magnetic layer 4 of the magnetic recording medium 100. The material forming the soft magnetic layer is not limited to a particular material. For example, amorphous alloys such as CoTaZr alloys, CoFeTaB alloys, CoFeTaSi alloys, CoFeTaZr alloys, or the like may be used for the soft magnetic layer. In addition, microcrystal alloys such as FeTaC alloys, FeTaN alloys, or the like may be used for the soft magnetic layer. Further, polycrystal alloys such as NiFe alloys, or the like may be used for the soft magnetic layer. The soft magnetic layer may have a single-layer structure, or a stacked structure in which a pair of soft magnetic layers are antiferromagnetically coupled via a Ru layer that has a suitable thickness and is sandwiched between the pair of soft magnetic layers.

Layers other than the layers described above, such as a seed layer, a bonding layer, or the like may be additionally provided in the magnetic recording medium 100, if required.

[Magnetic Storage Apparatus]

Next, an example of a structure of a magnetic storage apparatus in one embodiment will be described. The magnetic storage apparatus in this embodiment includes one or more magnetic recording media of this embodiment.

For example, the magnetic storage apparatus includes a driving mechanism that drives the magnetic recording medium in a recording direction, and a magnetic head having a near-field light generator (or near-field light generating element) provided on a tip end thereof. The magnetic storage apparatus also includes a laser generator that generates laser light for heating the magnetic recording medium, a waveguide that guides the laser light generated from the laser generator to the near-field light generator, a head moving mechanism that moves the magnetic head, and a signal processor that processes signals that are input to the magnetic head to be recorded on the magnetic recording medium, and processes signals that are reproduced from the magnetic recording medium by the magnetic head and output from the magnetic head.

Figure 3:
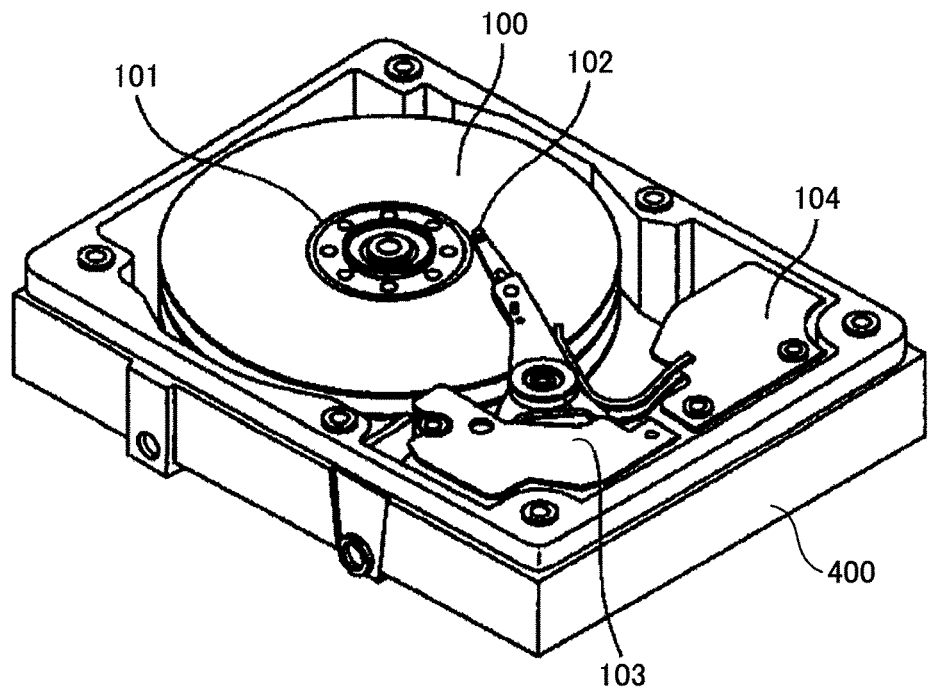
FIG. 3 is a perspective view illustrating an example of a magnetic storage apparatus in one embodiment of the present invention.

FIG. 3 is a perspective view illustrating the example of the magnetic storage apparatus in one embodiment of the present invention.

The magnetic storage apparatus illustrated in FIG. 3 includes a plurality of magnetic recording media 100, a driving mechanism 101 that drives the magnetic recording media 100 in a recording direction, a plurality of magnetic heads 102, a head moving mechanism 103 that moves the magnetic heads 102, and a signal processor 104 that are accommodated within a casing 400. In this example, the magnetic storage apparatus employs the heat assisted recording method. In addition, the plurality of magnetic recording media 100 are heat assisted magnetic disks employing the heat assisted recording method. Hence, in this example, the driving mechanism 101 rotates the plurality of magnetic recording media 100, that is, the heat assisted magnetic disks, in the recording direction.

Figure 4:
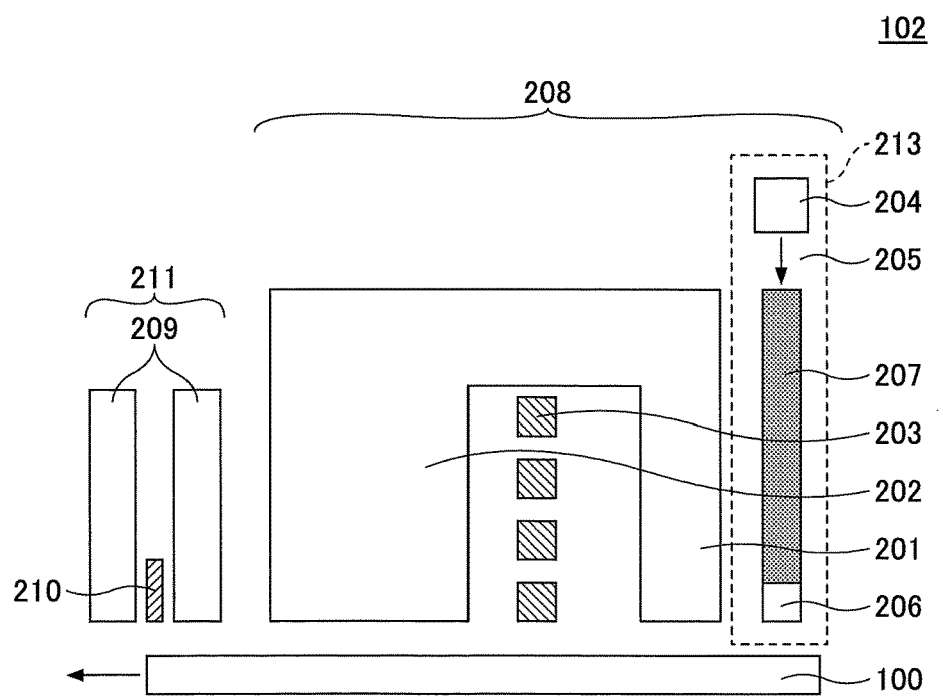
FIG. 4 is a cross sectional view schematically illustrating a structure of a magnetic head used in the magnetic storage apparatus in one embodiment.

FIG. 4 is a cross sectional view schematically illustrating a structure of the magnetic head used in the magnetic storage apparatus in one embodiment. The magnetic head 102 includes a recording (or write) head 208 that records (or writes) signals to a corresponding one of the plurality of magnetic recording media 100, and a reproducing (or read) head 211 that reproduces (or reads) signals from the corresponding one of the plurality of magnetic recording media 100.

The recording head 208 includes a main magnetic pole 201, an auxiliary magnetic pole 202, a coil 203 that generates a magnetic field, a laser diode 204 that is an example of the laser generator and generates laser light 205, a near-field light generator (or near-field light generating element) 206 that generates near-field light for heating the magnetic recording medium 100, and a waveguide 207. The waveguide 207 guides the laser light 205 generated from the laser diode 204 to the near-field light generator 206 that is provided at a tip end of the magnetic head 102.

The reproducing head 211 includes a reproducing element 211, such as a TMR (Tunneling Magneto-Resistive) element or the like, that is sandwiched between a pair of shields 209.

[Exemplary Implementations]

Next, exemplary implementations according to the present invention, together with comparison examples, will be described. However, the present invention is not limited to these exemplary implementations, and various variations, modifications, and substitutions may be made without departing from the scope of the present invention.

(Exemplary Implementation EI1)

In one embodiment, the heat assisted magnetic recording medium 100 illustrated in FIG. 1 in accordance with an exemplary implementation EI1-1 may be manufactured by the following method. The underlayer 7 in this example includes a first underlayer, a second underlayer, and a third underlayer that are stacked in this order.

First, the first underlayer made of Cr-50Ti (Cr-content of 50 at % and Ti-content of 50 at %) and having a thickness of 25 nm is deposited on the substrate 1 made of glass and having an outer diameter of 2.5 inches, and the substrate 1 is thereafter heated to 300° C. Next, the second underlayer made of Cr-5Mn (Cr-content of 95 at % and Mn-content of 5 at %) and having a thickness of 20 nm is formed on the first underlayer. Then, the third underlayer made of W and having a thickness of 20 nm is formed on the second underlayer.

A MgO layer having a thickness of 2 nm is formed on the third underlayer, as the barrier layer 2.

A Ag layer having an average thickness of 1 nm is formed on the barrier layer 2, as the crystal grain size control layer 3, and the substrate 1 is thereafter heated to 580° C.

A (Fe-45Pt)-12SiO$_2$-6BN (alloy-content of 82 mol % of alloy including Fe-content of 55 at % and Pt-content of 45 at %, SiO$_2$-content of 12 mol %, and BN-content of 6 mol %) and having a thickness of 10 nm is formed on the crystal grain size control layer 3, as the magnetic layer 4.

The carbon protection layer 5 having a thickness of 3 nm is formed on the magnetic layer 4. Then, the lubricant layer 6 made of perfluoropolyether fluororesin is formed on the protection layer 5, to thereby form the heat assisted magnetic recording medium 100.

(Exemplary Implementations EI2 to EI4)

The heat assisted magnetic recording medium 100 illustrated in FIG. 1 in accordance with exemplary implementations IE2 to EI4 are manufactured similarly to the heat assisted magnetic recording medium 100 in accordance with the exemplary implementation EI1 described above. However, the average thickness of the crystal grain size control layer 3 is 0.5 nm in the exemplary implementation EI2, 0.2 nm in the exemplary implementation EI3, and 0.1 nm in the exemplary implementation EI4.

Comparison Example CE1

The heat assisted magnetic recording medium in accordance with a comparison example CE1 is manufactured similarly to the heat assisted magnetic recording medium 100 in accordance with the exemplary implementation EI1 described above. However, no crystal grain size control layer 3 is provided in the heat assisted magnetic recording medium in accordance with the comparison example CE1.

Comparison Examples CE2 and CE3

The heat assisted magnetic recording media in accordance with comparison examples CE2 and CE3 are manufactured similarly to the heat assisted magnetic recording medium 100 in accordance with the exemplary implementation EI1 described above. However, the average thickness of the crystal grain size control layer 3 is 0.05 nm in the comparison example CE2, and 2 nm in the comparison example CE3.

(Exemplary Implementation EI5)

The heat assisted magnetic recording medium 100 illustrated in FIG. 1 in accordance with exemplary implementation IE5 is manufactured similarly to the heat assisted magnetic recording medium 100 in accordance with the exemplary implementation EI1 described above. However, the material forming the crystal grain size control layer 3 is changed to Ag-2GE (Ag-content of 98 at % and Ge-content of 2 at %) in the exemplary implementation EI5.

(Exemplary Implementations EI6 to EI12)

The heat assisted magnetic recording media 100 illustrated in FIG. 1 in accordance with exemplary implementations IE6 to EI12 are manufactured similarly to the heat assisted magnetic recording medium 100 in accordance with the exemplary implementation EI5 described above. However, the Ge-content of the crystal grain size control layer 3 is changed to 5 at % in the exemplary implementation EI6, 10 at % in the exemplary implementation EI7, 20 at % in the exemplary implementation EI8, 30 at % in the exemplary implementation EI9, 50 at % in the exemplary implementation EI10, 60 at % in the exemplary implementation EI11, and 70 at % in the exemplary implementation EI12.

(Exemplary Implementations EI13 to EI21)

The heat assisted magnetic recording media 100 illustrated in FIG. 1 in accordance with exemplary implementations IE13 to IE21 are manufactured similarly to the heat assisted magnetic recording medium 100 in accordance with the exemplary implementation EI1 described above. However, the material forming the crystal grain size control layer 3 is changed to Ag-20B in the exemplary implementation EI13, Ag-20C in the exemplary implementation EI14, Ag-20 (BN) in the exemplary implementation EI15, Ag-10Cu in the exemplary implementation EI16, Ag-50Si in the exemplary implementation EI17, Ag-50Ni in the exemplary implementation EI18, Ag-50Ti in the exemplary implementation EI19, Ag-50Sn in the exemplary implementation EI20, and Ag-20(MgO) in the exemplary implementation EI21.

Comparison Example CE4

The heat assisted magnetic recording medium in accordance with a comparison example CE4 is manufactured similarly to the heat assisted magnetic recording medium 100 in accordance with the exemplary implementation EI1 described above. However, the material forming the crystal grain size control layer 3 is changed to Cu in the heat assisted magnetic recording medium in accordance with the comparison example CE4.

Comparison Example CE5

The heat assisted magnetic recording medium in accordance with a comparison example CE5 is manufactured similarly to the heat assisted magnetic recording medium 100 in accordance with the exemplary implementation EI1 described above. However, a Ag-20(SiO$_2$) layer having an average thickness of 5 nm is formed as the crystal grain size control layer 3 in the heat assisted magnetic recording medium in accordance with the comparison example CE5.

Comparison Example CE6

The heat assisted magnetic recording medium in accordance with a comparison example CE6 is manufactured similarly to the heat assisted magnetic recording medium 100 in accordance with the exemplary implementation EI1 described above. However, a Ag-20Cu layer having an average thickness of 5 nm is formed as the crystal grain size control layer 3 in the heat assisted magnetic recording medium in accordance with the comparison example CE6.

(Evaluation)

Next, the average grain diameter (or average grain size) of FePt magnetic grains and the (001) orientation of the magnetic layer 4 were evaluated.

(Average Grain Diameter of FePt Magnetic Grains of Magnetic Layer)

The average grain diameter of the FePt magnetic grains were measured using a SEM (Scanning Electron Microscope) manufactured by Hitachi High-Technologies Corporation.

Because the compositions of the magnetic layers 4 are the same in each of the exemplary implementations and the comparison examples, a correlation exists between the average grain diameter of the FePt magnetic grains and the density of the FePt magnetic grains. In other words, The density of the FePt magnetic grains becomes low in a case in which the average grain diameter of the FePt magnetic grains is large, and the density of the FePt magnetic grains becomes high in a case in which the average grain diameter of the FePt magnetic grains is small.

((001) Orientation of Magnetic Layer)

An XRD (X-Ray Diffraction) spectrum of each intermediate (or semi-manufactured) sample manufactured up to the magnetic layer 4 of the heat assisted magnetic recording medium was measured using an X-ray diffractometer manufactured by Koninklijke Philips N.V., to obtain a FWHM (Full Width at Half Maximum) of the FePt(200) peak.

The (001) orientation of the magnetic layer 4 was evaluated using the (200) peak of the FePt alloy having the L1$_0$ crystal structure included in the magnetic layer 4, that is, using the FWHM of the FePt(200) peak. A diffraction angle (or emergence angle) 2θ of a (001) peak of the FePt alloy, that is, the FePt(001) peak, is not sufficiently large. For this reason, even if the low-angle side is widened when measuring a rocking curve, an intensity of the FePt(001) peak is unstable compared to a case in which no peak exists, thereby making it difficult to analyze the FWHM. Due to this unstable intensity of the FePt(001) peak encountered during the measurement, it is difficult to evaluate the (001) orientation of the magnetic layer 4 using the FWHM of the FePt(001) peak. On the other hand, the FePt(200) peak appears when the FePt alloy assumes the (001) orientation, but the diffraction angle (or emergence angle) 2θ of the FePt(200) peak is sufficiently large, thereby making the FePt(200) peak suitable for evaluating the (001) orientation of the magnetic layer 4.

The FWHM of the FePt(200) peak could not be measured for the intermediate sample of the heat assisted magnetic recording medium in accordance with the comparison example CE4.

FIG. 5 is a table illustrating evaluation results of the average grain diameter of the FePt magnetic grains and the FePt(200) peak of the magnetic layer 4 for the exemplary implementations EI1 to EI21 and the comparison examples CE1 to CE6.

It was confirmed from the table of FIG. 5 that a correlation exists between the average grain diameter of the FePt magnetic grains and the FWHM of the FePt(200) peak, and that the FWHM of the FePt(200) peak has a tendency to increase when the average grain diameter of the FePt magnetic grains decreases. In other words, it was confirmed that improving the (001) orientation of the magnetic layer 4 and reducing the grain size of the magnetic grains forming the magnetic layer 4 are in a tradeoff relationship.

It was confirmed from the table of FIG. 5 that the heat assisted magnetic recording media 100 in accordance with the exemplary implementations EI1 to EI21 can simultaneously maintain satisfactory (001) orientation of the magnetic layer 4, and reduce the size of the FePt magnetic grains forming the magnetic layer 4.

On the other hand, the heat assisted magnetic recording medium in accordance with the comparison example CE1 is not provided with the crystal grain size control layer 3. Hence, it was confirmed from the table of FIG. 5 that the grain size of the FePt magnetic grains forming the magnetic layer 4 cannot be reduced according to the comparison example CE1.

The heat assisted magnetic recording medium in accordance with the comparison example CE2 has the crystal grain size control layer 3 having the average thickness of 0.05 nm. Hence, it was confirmed from the table of FIG. 5 that the grain size of the FePt magnetic grains forming the magnetic layer 4 cannot be reduced according to the comparison example CE2.

The heat assisted magnetic recording media in accordance with the comparison examples CE3, CE5, and CE6 have the crystal grain size control layer 3 having the average thickness of 2 nm or 5 nm. Hence, it was confirmed from the table of FIG. 5 that the grain size of the FePt magnetic grains forming the magnetic layer 4 cannot be reduced according to the comparison examples CE3, CE5, and CE6.

The heat assisted magnetic recording medium in accordance with the comparison example CE4 has the crystal grain size control layer 3 formed by Cu. Hence, it was confirmed from the table of FIG. 5 that a satisfactory (001) orientation of the magnetic layer 4 cannot be maintained, and that the grain size of the FePt magnetic grains forming the magnetic layer 4 cannot be reduced, according to the comparison example CE4.

Embodiments and exemplary implementations of the present invention can provide a magnetic recording medium and a magnetic storage apparatus, which can simultaneously maintain satisfactory (001) orientation of the magnetic layer that includes an alloy having the $L1_0$ crystal structure, and reduce the size of the magnetic grains forming the magnetic layer.

Although the exemplary implementations are numbered with, for example, "first," "second," "third," etc., the ordinal numbers do not imply priorities of the exemplary implementations.

Further, the present invention is not limited to these embodiments and exemplary implementations, but various variations and modifications may be made without departing from the scope of the present invention.

What is claimed is:

1. A magnetic recording medium comprising:
    a substrate, a barrier layer, a crystal grain size control layer, and a magnetic layer that are arranged in this order,
    wherein the barrier layer includes at least one of oxides, nitrides, and carbides,
    wherein the crystal grain size control layer is a crystalline layer including Ag and having an average thickness in a range of 0.1 nm to 1 nm,
    wherein the barrier layer makes contact with the crystal grain size control layer, and
    wherein the magnetic layer includes an alloy having a $L1_0$ crystal structure and a (001) face orientation.

2. The magnetic recording medium as claimed in claim 1, wherein the crystal grain size control layer includes crystalline point-like precipitates including Ag.

3. The magnetic recording medium as claimed in claim 1, wherein the crystal grain size control layer includes one or more added materials selected from a group consisting of B, C, Si, Ge, Cu, Ni, Ti, Sn, BN, and MgO.

4. The magnetic recording medium as claimed in claim 3, wherein the crystal grain size control layer includes the one or more added materials in a range of 5 mol % to 60 mol %.

5. The magnetic recording medium as claimed in claim 4, wherein the barrier layer includes one or more materials selected from a group consisting of MgO, TiO, NiO, TiN, TaN, HfN, NbN, ZrC, HfC, TaC, NbC, and TiC.

6. The magnetic recording medium as claimed in claim 1, wherein the barrier layer includes one or more materials selected from a group consisting of MgO, TiO, NiO, TiN, TaN, HfN, NbN, ZrC, HfC, TaC, NbC, and TiC.

7. The magnetic recording medium as claimed in claim 2, wherein the crystal grain size control layer includes one or more added materials selected from a group consisting of B, C, Si, Ge, Cu, Ni, Ti, Sn, BN, and MgO.

8. The magnetic recording medium as claimed in claim 7, wherein the crystal grain size control layer includes the one or more added materials in a range of 5 mol % to 60 mol %.

9. The magnetic recording medium as claimed in claim 2, wherein the barrier layer includes one or more materials selected from a group consisting of MgO, TiO, NiO, TiN, TaN, HfN, NbN, ZrC, HfC, TaC, NbC, and TiC.

10. A magnetic storage apparatus comprising:
    the magnetic recording medium according to claim 1; and
    a magnetic head configured to write information to and read information from the magnetic recording medium.

11. A magnetic storage apparatus comprising:
    a magnetic recording medium;
    a magnetic head configured to write information to and read information from the magnetic recording medium; and
    a casing configured to accommodate the magnetic recording medium and the magnetic head,
    wherein the magnetic head includes a laser light generator configured to generate laser light, a waveguide configured to guide the laser light to a tip end of the magnetic head, and a near-field light generator configured to generate near-field light that heats the magnetic recording medium,
    wherein the magnetic recording medium includes a substrate, a barrier layer, a crystal grain size control layer, and a magnetic layer that are arranged in this order,
    wherein the barrier layer includes at least one of oxides, nitrides, and carbides,
    wherein the crystal grain size control layer is a crystalline layer including Ag and having an average thickness in a range of 0.1 nm to 1 nm,
    wherein the barrier layer makes contact with the crystal grain size control layer, and
    wherein the magnetic layer includes an alloy having a $L1_0$ crystal structure and a (001) face orientation.

12. The storage apparatus as claimed in claim 11, wherein the crystal grain size control layer of the magnetic recording medium includes crystalline point-like precipitates including Ag.

13. The magnetic storage apparatus as claimed in claim 11, wherein the crystal grain size control layer of the magnetic recording medium includes one or more added materials selected from a group consisting of B, C, Si, Ge, Cu, Ni, Ti, Sn, BN, and MgO.

14. The magnetic storage apparatus as claimed in claim 13, wherein the crystal grain size control layer of the magnetic recording medium includes the one or more added materials in a range of 5 mol % to 60 mol %.

15. The magnetic storage apparatus as claimed in claim 11, wherein the barrier layer of the magnetic recording medium includes one or more materials selected from a group consisting of MgO, TiO, NiO, TiN, TaN, HfN, NbN, ZrC, HfC, TaC, NbC, and TiC.

* * * * *